(12) United States Patent
Christiansson et al.

(10) Patent No.: US 11,106,312 B2
(45) Date of Patent: Aug. 31, 2021

(54) TOUCH APPARATUS

(71) Applicant: FlatFrog Laboratories AB, Lund (SE)

(72) Inventors: Tomas Christiansson, Torna Hällestad (SE); Orjan Friberg, Lund (SE); David Andersson, Malmo (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 16/977,715

(22) PCT Filed: Mar. 6, 2019

(86) PCT No.: PCT/SE2019/050193
§ 371 (c)(1),
(2) Date: Sep. 2, 2020

(87) PCT Pub. No.: WO2019/172829
PCT Pub. Date: Sep. 12, 2019

(65) Prior Publication Data
US 2021/0055825 A1 Feb. 25, 2021

(30) Foreign Application Priority Data

Mar. 8, 2018 (SE) .................................... 1830079-8

(51) Int. Cl.
G06F 3/041 (2006.01)
G06F 3/042 (2006.01)

(52) U.S. Cl.
CPC ........ G06F 3/0418 (2013.01); G06F 3/04166 (2019.05); *G06F 3/0421* (2013.01)

(58) Field of Classification Search
CPC ... G06F 3/0418; G06F 3/04166; G06F 3/0421
See application file for complete search history.

(56) References Cited

U.S. PATENT DOCUMENTS

| 2012/0017182 | A1 | 1/2012 | Bau |
| 2013/0181908 | A1 | 7/2013 | Santiago |
| 2013/0271487 | A1 | 10/2013 | Lincoln |
| 2014/0118295 | A1 | 5/2014 | Motoi |
| 2014/0204036 | A1 | 7/2014 | Schillings et al. |
| 2015/0062021 | A1 | 3/2015 | Skaljak et al. |
| 2015/0091832 | A1 | 4/2015 | Mizunuma et al. |
| 2015/0169948 | A1 | 6/2015 | Motoi |
| 2016/0092021 | A1 | 3/2016 | Tu et al. |

FOREIGN PATENT DOCUMENTS

WO    WO 2015084644 A1    6/2015

OTHER PUBLICATIONS

International Search Report in PCT/SE2019/050193 dated Oct. 4, 2019 in 4 pages.

*Primary Examiner* — Michael Pervan
(74) *Attorney, Agent, or Firm* — Knobbe Martens Olson & Bear, LLP

(57) ABSTRACT

A method of predicting the behaviour of one or more objects on a touch surface of a touch-sensitive apparatus comprises outputting an object position value of a first time series describing a position of the one or more objects on the touch surface. The method further comprises outputting an object position value of a second time series describing a position of the one or more objects on the touch surface. The object position value of the second time series is outputted before the corresponding object position value of the first time series. The method yet further comprises predicting the behaviour of the one or more objects based at least on the object position values of the second time series.

20 Claims, 7 Drawing Sheets

TOUCH APPARATUS

The present invention relates to an improved touch experience on touch surfaces of touch-sensitive apparatus. In particular, the present invention relates to predicting a behaviour on a touch-sensitive apparatus Touch-sensitive systems ("touch systems") are in widespread use in a variety of applications. Typically, the touch systems are configured to detect a touching object such as a finger or stylus, either in direct contact, or through proximity (i.e. without contact), with a touch surface. Touch systems may be used as touch pads in laptop computers, equipment control panels, and as overlays on displays e.g. hand held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc. into a touch panel. There are also various types of optical touch systems, which e.g. detect attenuation of emitted light by touch objects on or proximal to a touch surface.

One specific type of optical touch system uses projection measurements of light that propagates on a plurality of propagation paths inside a light transmissive panel. The projection measurements thus quantify a property, e.g. power, of the light on the individual propagation paths, when the light has passed the panel. For touch detection, the projection measurements may be processed by simple triangulation, or by more advanced image reconstruction techniques that generate a two-dimensional distribution of disturbances on the touch surface, i.e. an "image" of everything on the touch surface that affects the measured property. The light propagates by total internal reflection (TIR) inside the panel such that a touching object causes the propagating light on one or more propagation paths to be attenuated by so-called frustrated total internal reflection (FTIR). Hence, this type of system is an FTIR-based projection-type touch system. Examples of such touch systems are found in U.S. Pat. Nos. 3,673,327, 4,254,333, 6,972,753, US2004/0252091, US2006/0114237, US2007/0075648, WO2009/048365, US2009/0153519, US2017/0344185, WO2010/006882, WO20 10/064983, and WO2010/134865.

Another category of touch sensitive apparatus is known as projected capacitive ("p-cap"). A set of electrodes are spatially separated in two layers usually arranged in rows and columns. A controller scans and measures the capacitance at each row and column electrode intersection. The intersection of each row and column produces a unique touch-coordinate pair and the controller measures each intersection individually. An object that touches the touch surface will modify the capacitance at a row and column electrode intersection. The controller detects the change in capacitance to determine the location of the object touching the screen.

In another category of touch-sensitive apparatus known as 'above surface optical touch systems', a set of optical emitters are arranged around the periphery of a touch surface to emit light that travels above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors. Examples of such touch systems are found in e.g. PCT/SE2017/051233 and PCT/EP2018/052757.

When using a touch-sensing apparatus with a host control device, standard drawing can suffer from total system latency which results in a visual lag on a display device coupled to the host control device. Latency can be introduced from the touch-sensing apparatus, the host control device or the display device.

Various known techniques have been adopted to reduce touch system latency. For example, a touch-sensitive apparatus can be configured to increase the scan rate of the touch-sensing apparatus or to use faster processors to carry out the touch decoding faster or the touch signal post processing in a shorter time. Host control devices can be configured so that the operating system does not introduce delays in transmitting signal input to application software. The operating systems can be further configured to avoid buffering. Similarly, the display devices can be configured so that display driver electronics minimise latency in the total system.

A problem with using less scanning time to reduce the latency of the touch-sensing apparatus is that this increases the signal-to-noise ratio. This can increase the jitter of coordinate output and reduce the accuracy of detecting touch signals.

An alternative solution is for the host control device to control the display device to reduce the visual effect of total system latency. Such a system (e.g. Windows Ink) temporarily displays a predicted touch trace (also known as "evanescent predictions") based on human interface device (HID) input. The predicted touch trace is drawn before the confirmed touch trace and in this way the user perceives a reduced latency total system latency. The predicted touch trace is then redrawn each frame. A problem with this solution is that it is difficult to create a visual effect to reduce the perceived total system latency without drawing errors such as overshoots. These errors mean that the predicted touch trace is incorrect and can cause another visually jarring effect for the user.

Embodiments of the present invention aim to address the aforementioned problems.

According to an aspect of the present invention there is a method of predicting the behaviour of one or more objects on a touch surface of a touch-sensitive apparatus, the method comprising: outputting an object position value of a first time series describing a position of the one or more objects on the touch surface; outputting an object position value of a second time series describing a position of the one or more objects on the touch surface; wherein the object position value of the second time series is outputted before the corresponding object position value of the first time series; and predicting the behaviour of the one or more objects based at least on the object position values of the second time series.

In this way the latency of predicting the position of one or more objects on a touch surface is reduced. The user experience is improved because less errors are introduced when the host device uses the object position values from the second time series for predicting the location of the detected touch event.

Preferably the predicted behaviour is a predicted position of the one or more objects, a predicted removal of the one or more objects from the touch surface, a predicted orientation of the one or more objects and/or a predicted movement of the one or more objects.

Preferably the position value of the first time series is more accurate than the object position value of the second time series.

Preferably the step of outputting the object position value of the first time series is via a first connection path and the step of outputting the object position value of the second time series is via a second connection path. Preferably the first and/or the second connection paths are be logical or physical data connections. Preferably the step of outputting the object position value of the first time series comprises outputting over a human interface device channel. Preferably the first time series comprises coordinates according to a native standard of an operating system. Preferably the outputting of the object positions value of the second time series comprises outputting over second channel different from the first channel. By sending the first time series and second time series over different connections, the host control device does not confuse the first and second sets.

Preferably the object position values of the second time series is in the same format and the object position values of the first time series. This means that the host control device can process the second time series in the same way as the first time series.

Preferably the second time series and/or the first time series comprises one or more metadata respectively associated with the object position value of the second time series and/or the first time series. Preferably the metadata in the first time series and/or the second time series is one or more of the following device lift up indication, pressure of device, orientation of device, angle of device, shape of device, speed of device, direction of device, type of device. This means that the second time series can include further information for improving predicting the touch trace.

Preferably the object position value of the second time series are outputted from a touch controller of the touch-sensitive apparatus to an application of a host device. Preferably the object position value of the first time series are outputted from a touch controller of the touch-sensitive apparatus to an operating system of a host device. This can reduce the buffering that a host control device can apply when processing the first or second time series location data.

Preferably the outputting of the object position value of the second time series is carried out before signal processing is completed on the corresponding object position value of the first time series. Preferably the signal processing of the object value of the first time series comprises one or more of smoothing, filtering and/or reconstruction. This means that the object position value of the second time series is received earlier, but with the trade-off of being a less accurate prediction of the location of the detected touch event.

Preferably the predicting the position comprises processing a plurality of object position values of the first and second time series from a plurality of different times to generate a predicted touch trace.

Preferably the step of predicting comprises reducing the weighting of the object position value of the second time series on receipt of an updated object position value of the first time series and/or an updated object position value of the second time series.

Preferably the step of predicting comprises reducing the weighting of the object position value of the second time series on receipt of an updated metadata of the first time series and/or an updated metadata of the second time series.

Preferably the step of predicting comprises using a p-spline regression, linear extrapolation, and/or extrapolation using least square fitting of low order polynomial based on the object position value of the second time series and/or the first time series.

Preferably the step of predicting comprises using a p-spline regression, linear extrapolation, and/or extrapolation using least square fitting of low order polynomial based metadata of the second time series and/or the first time series.

Preferably both the first time series and the second time series use at least some data from the same scan frame.

In a second aspect there is provided a computer readable medium comprising computer instructions which, when executed by a data-processing system, are configured to carry out the preceding aspects.

In a third aspect there is provided a system for determining touch of one or more objects, the system comprising: a touch-sensitive apparatus comprising a touch surface and a processing unit for processing an output signal of the touch-sensitive apparatus at a particular time; wherein the touch-sensitive apparatus is configured to output an object position value of a first time series describing the position of the one or more objects on the touch surface; and to output an object position value of a second time series describing the position of the one or more objects on the touch surface; wherein the an object position value of the second time series is outputted before the corresponding object position value of the first time series.

In a fourth aspect there is provided a system for determining touch of one or more objects, the system comprising: a touch-sensitive apparatus comprising a touch surface and a processing unit for processing an output signal of the touch-sensitive apparatus at a particular time; wherein the touch-sensitive apparatus is configured to output an object position value of a first time series describing the position of the one or more objects on the touch surface over a first connection path; and the touch-sensitive apparatus is configured to output an object position value of a second time series describing the position of the one or more objects on the touch surface over a second connection path.

Various other aspects and further embodiments are also described in the following detailed description and in the attached claims with reference to the accompanying drawings, in which:

Figure 1:
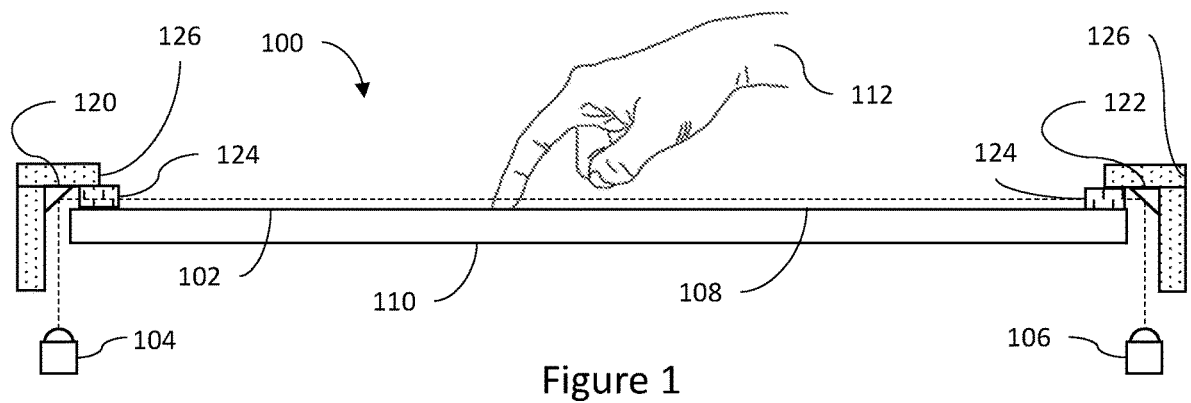
FIG. 1 shows a schematic side view of a touch-sensitive apparatus.
Figure 2:
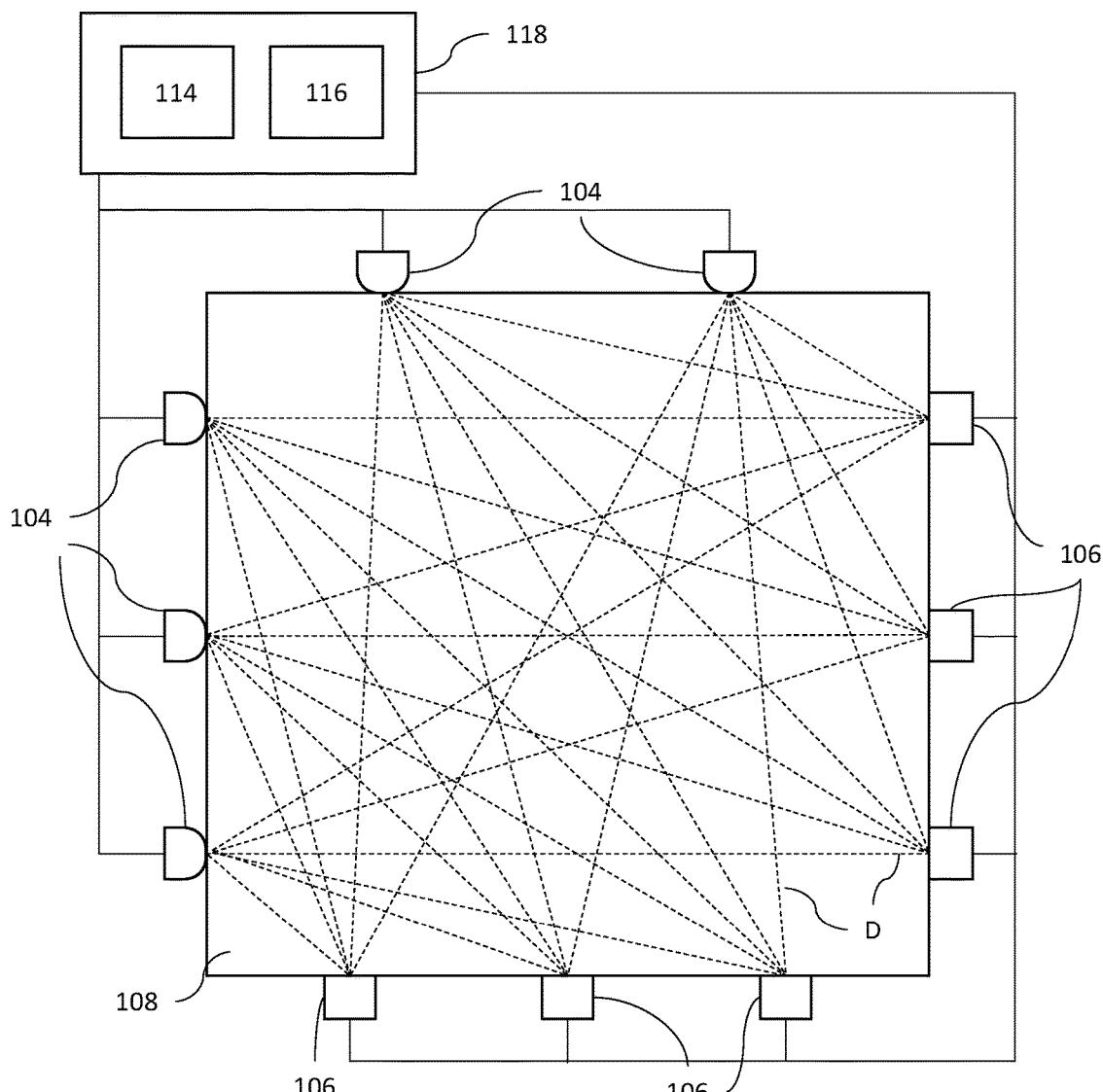
FIG. 2 shows schematic top view of a touch-sensitive apparatus.

FIGS. 1 and 2 illustrate an example embodiment of a touch-sensitive apparatus 100 known as 'above surface optical touch systems'. FIG. 1 shows a schematic side view of a touch-sensitive apparatus 100. FIG. 2 shows schematic top view of a touch-sensitive apparatus 100. The touch-sensitive apparatus 100 comprises a set of optical emitters 104 which are arranged around the periphery of a touch surface 108. The emitters 104 are configured to emit light that is reflected to travel above a touch surface 108. A set of light detectors 106 are also arranged around the periphery of the touch surface 108 to receive light from the set of emitters 104 from above the touch surface 108.

An object 112 that touches the touch surface 108 will attenuate the light on one or more propagation paths D of the light and cause a change in the light received by one or more of the detectors 106. The location (coordinates), shape or area of the object 112 may be determined by analysing the received light at the detectors.

In some embodiments, the emitters 104 are arranged on a substrate (not shown), and light from the emitters 104 travel above the touch surface 108 of a panel 102 mounted in a housing 126 via reflection or scattering on an edge reflector 120 or diffusor. The emitted light may propagate through a light transmissive sealing window 124. The light transmissive sealing window 124 allows light to propagate therethrough but to prevent ingress of dirt into the housing 126 where the electronics and other components are mounted. The light will then continue until deflected by a corresponding edge reflector 122 at an opposing edge of the touch panel 102, where the light will be scattered back down around the touch panel 102 and onto the detectors 106. The touch panel 102 can be a light transmissive panel for allowing light from a display device 204 propagating therethrough.

In this way, the touch sensitive apparatus 100 may be designed to be overlaid on or integrated into a display device or monitor. Alternatively, the touch panel 102 can be opaque and located remote from the display device 204.

The touch sensitive apparatus 100 allows an object 112 that is brought into close vicinity of, or in contact with, the touch surface 108 to interact with the propagating light at the point of touch. In this interaction, part of the light may be scattered by the object 112, part of the light may be absorbed by the object 112, and part of the light may continue to propagate in its original direction over the panel 102.

The sensors 106 collectively provide an output signal, which is received and sampled by a signal processor 114. The output signal contains a number of sub-signals, also denoted "projection signals", each representing the energy of light emitted by a certain light emitter 104 and received by a certain light sensor detector 106. Depending on implementation, the signal processor 114 may need to process the output signal for separation of the individual projection signals. Conceptually, the touch apparatus 100 is considered to define a grid of detection lines D on the touch surface 108, where each detection line D corresponds to a light propagation path from an emitter 104 to a detector 106, as projected onto the touch surface 108. Thus, the projection signals represent the received energy or power of light on the individual detection lines D. It is realized that the touching object 112 results in a decrease (attenuation) of the received energy on one or more detection lines D.

The signal processor 114 may be configured to process the projection signals so as to determine a distribution of signal strength values (for simplicity, referred to as an "touch surface pattern") across the touch surface 108, where each signal strength value represents a local attenuation of light. The touch surface pattern may be represented in many different ways, e.g. as signal strength values arranged in a regular x y-grid, such as in an ordinary digital image, although other types of grids are conceivable, e.g. hexagonal patterns or triangular meshes. The touch surface pattern is also known as "reconstruction" and in some embodiments, the reconstruction is carried out by a reconstruction module 218 as shown in FIG. 2. One reconstruction technique is tomographic reconstruction which is described in WO 2011/139213 and is incorporated herein by reference. Other reconstruction techniques for determining the touch surface pattern can be used.

Figure 3:
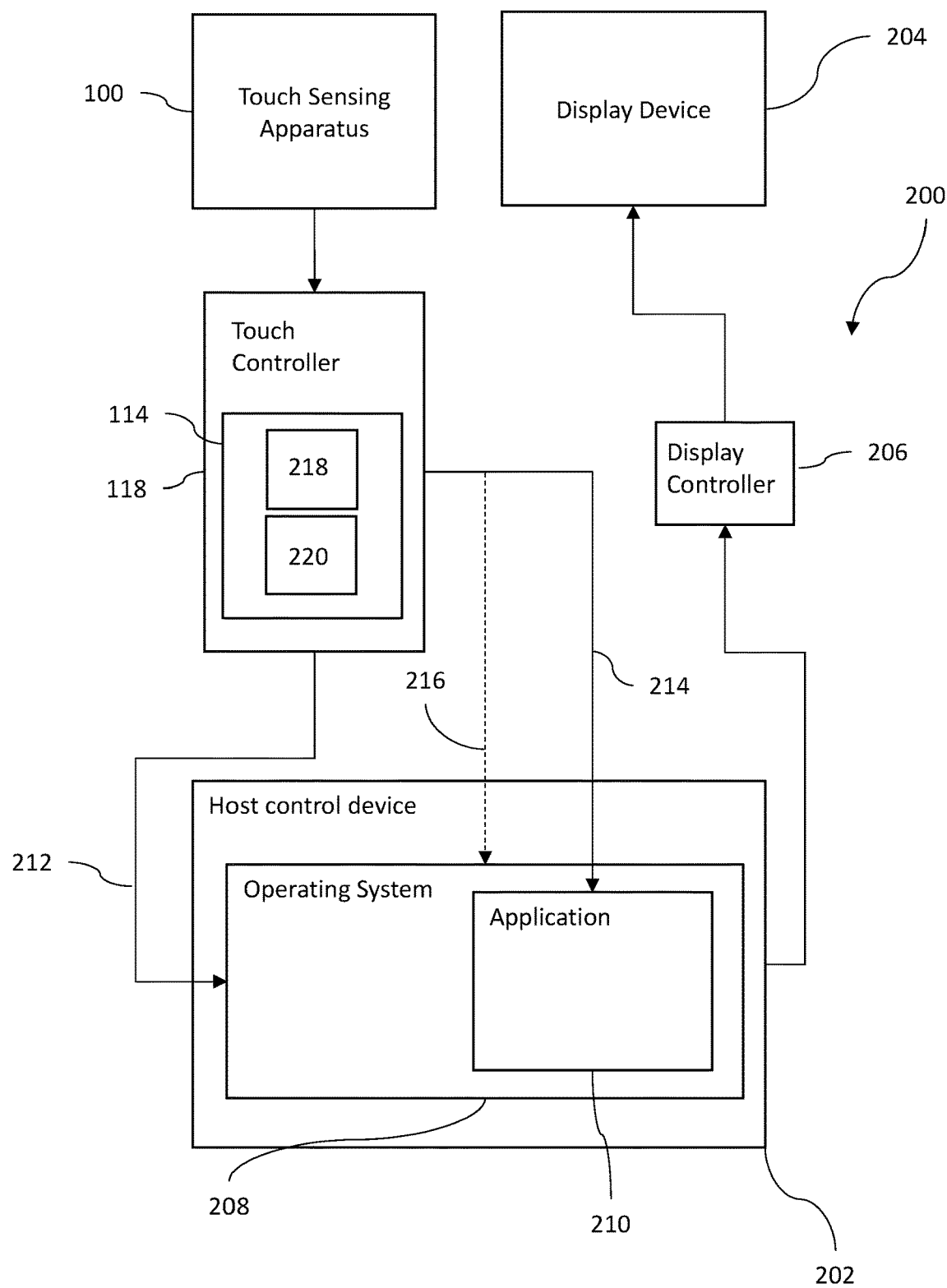
FIG. 3 shows a schematic representation of a touch system.

The signal processor 114 is configured to carry out a plurality of different signal processing steps in order to extract touch data for at least one object. Additional signal processing steps may involve filtering, back projection, smoothing, and other post-processing techniques as described in WO 2011/139213, which is incorporated herein by reference. In some embodiments the filtering and smoothing of the reconstructed touch data is carried out by a filtering module 220 as shown in FIG. 3. The reconstructed touch data is passed from the reconstruction module 218 to the filtering module 220 in order to remove noise and other possible errors in the reconstructed touch surface pattern.

Turning back to FIG. 1, in the illustrated example, the apparatus 100 also includes a controller 116 which is connected to selectively control the activation of the emitters 104 and, possibly, the readout of data from the sensors 106. The signal processor 114 and the controller 116 may be configured as separate units, or they may be incorporated in a single unit. One or both of the signal processor 114 and the controller 116 may be at least partially implemented by software executed by a processing unit 118. The reconstruction and filtering modules 218, 220 of the signal processor 114 may be configured as separate units, or they may be incorporated in a single unit. One or both of the modules 218, 220 may be at least partially implemented by software executed by a the signal processing unit 114 or the processing unit 118.

The processing unit 118 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analogue hardware components.

The processing unit 118 may include one or more processing units, e.g. a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). The processing unit 118 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/nonvolatile computer storage media which is included in or accessible to the computing device, such as magnetic media, optical media, flash memory cards, digital tape, solid state RAM, solid state ROM, etc. The processing unit 118 may include one or more communication interfaces, such as a serial interface, a parallel interface, a USB interface, a wireless interface, a network adapter, etc, as well as one or more data acquisition devices, such as an ND converter. The special-purpose software may be provided to the processing unit 118 on any suitable computer-readable medium, including a record medium, and a read-only memory.

It is to be understood that FIGS. 1 and 2 merely illustrates one example of an above surface optical touch system. However, it should be understood that the concepts discussed in the summary of the invention and claims and the embodiments can be applied to any other above surface optical touch system configuration as well as non-above surface optical touch system types which perform touch detection in frames. In some embodiments the touch-sensitive apparatus 100 can use one or more of the following including: FTIR, resistive, surface acoustic wave, capacitive, surface capacitance, projected capacitance, above surface optical touch, dispersive signal technology and acoustic pulse recognition type touch systems. The touch-sensitive apparatus 100 can be any suitable apparatus for detecting touch input from a human interface device.

The relationship between the touch-sensing apparatus 100 and a touch system 200 will now be discussed in reference to FIG. 3. FIG. 3 shows a schematic representation of a touch system 200. The touch system 200 comprises the touch-sensitive apparatus 100, a host control device 202 and a display device 204. The display device 204 is configured to display the output from the host device 202. The display device 204 can be any suitable device for visual output for a user such as a monitor. The display device 204 is controlled by a display controller 206. Display devices 204 and display controllers 206 are known and will not be discussed in any further depth for the purposes of expediency. In some embodiments the display controller 206 is a "T-Con" although other display controllers can be used.

The host control device 202 is connectively coupled to the touch-sensitive apparatus 100. The host control device 202 receives output from the touch-sensitive apparatus 100. In some embodiments the host control device 202 and the touch-sensitive apparatus 100 are connectively coupled via USB connection 212. In other embodiments other wired or wireless data connection 212 can be provided to permit data transfer between the host control device 202 and the touch-sensitive apparatus 100. For example, the data connection 212 can be ethernet, firewire, Bluetooth, Wi-Fi, or any other suitable data connection. In some embodiments there can be a plurality of data connections between the host control device 202 and the touch-sensitive apparatus 100 for transmitting different types of data. The touch-sensitive apparatus 100 detects a touch object when a physical object is brought in sufficient proximity to, a touch surface 108 so as to be detected by one or more sensors 106 in the touch-sensitive apparatus 100. The physical object may be animate or inanimate. In preferred embodiments the data connection 212 is a human interface device (HID) USB channel. The connection path 212 can be a logical or physical connection.

In some embodiments the touch-sensitive apparatus 100, the host control device 202 and the display device 204 are integrated into the same device such as a laptop, tablet, smart phone, monitor or screen. In other embodiments, the touch-sensitive apparatus 100, the host control device 202 and the display device 204 are separate components. For example, the touch-sensitive apparatus 100 can be a separate component mountable on a display screen.

The host control device 202 comprises an operating system 208 and one or more applications 210 that are operable on the operating system 208. The one or more applications 210 are configured to allow the user to interact with the touch-sensitive apparatus 100 and the display device 204. The operating system 208 is configured to run the one or more applications 210 and send output information to the display controller 206 for displaying on the display device 204. The applications 210 can be drawing applications or whiteboards applications for visualising user input. In other embodiments the applications 210 can be any suitable application or software for receiving and displaying user input.

On detection of a touch event on the touch-sensitive apparatus 100, the touch controller 118 performs signal processing techniques as mentioned above to generate a determined touch location of a touch event from a touch object 112. Detection of a physical object in proximity with the touch surface 108 results in a touch event. For example, the attenuation of transmitted light from one or more emitters 104 may generate a touch event. This can be caused by a hand or an input device 406. In some embodiments, the determined touch location associated with the touch event is sent to the operating system 208 of the host control device 202. The operating system 208 can pass the determined touch location information (e.g. a set of coordinates for the determined touch location) to the application 210. The application 210 can then send instructions or data for graphical representation of the determined touch coordinates to the display device 204 via the operating system and display controller 206. Accordingly, the user input is displayed on the display device 204 in the format required by the application 210.

Figure 4:
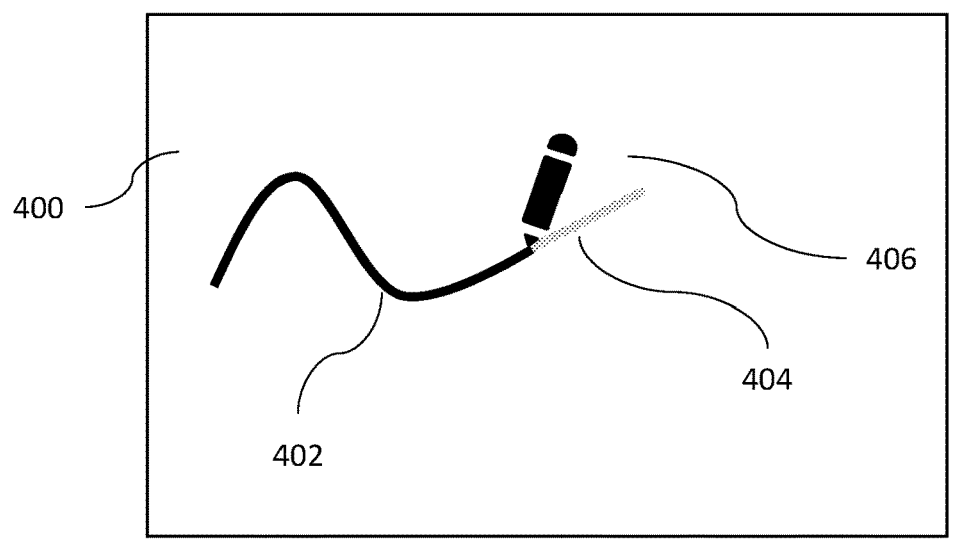
FIG. 4 shows a schematic representation of a touch trace on a touch-sensitive apparatus with an input device.

As shown in FIG. 4, the determined touch coordinates form part of a confirmed and determined touch trace 402 when displayed on the display device 204. The determined touch coordinates are outputted by the touch controller 118 once the touch controller 118 has detected a touch event and then confirmed the location of the touch event through signal processing and post-processing.

FIG. 4 shows a schematic representation of a touch-sensitive apparatus 100 with the input device 406. FIG. 4 represents the touch trace on the touch-sensitive apparatus 100. The input device 406 can be a pen, stylus, finger or any other suitable input device. For the purposes of clarity, only the visual output 400 of the display device 204 is shown in FIG. 4. The determined touch trace 402 is the temporal history of a time series of determined touch events on the touch-sensitive apparatus 100. A sequence of touch events may be determined over a series of repeated determination and confirmation steps of touch data from a sequence of touch events. The determined touch trace 402 represents the accumulation of determined touch events over a period of time.

When using the touch-sensing apparatus 100 with the host control device 202, drawing in the applications 210 can suffer from total system latency which results in a visual lag on the display device 204. One application-based method for reducing the user inconvenience associated with the total system latency is to display a predicted touch trace 404 before the determined touch trace 402. The predicted touch trace 404 in some embodiments may be known as an 'evanescent prediction". The predicted touch trace 404 is the predicted temporal path of future touch events on the touch-sensitive apparatus 100. In this way, a user experiences a predicted touch trace 404 being displayed ahead of the determined touch trace 402. In some embodiments it may not be possible for the user to distinguish between the determined touch trace 402 and the predicted touch trace 404.

The predicted touch trace 404 is interpolated or extrapolated by an application 210 based on the determined touch trace 402. The determined touch trace is transmitted over the HID channel 212. In some embodiments object position values of the first time series comprises coordinates according to a native standard of an operating system. In some embodiments the first time series comprises coordinates according to the HID standard.

As mentioned, the application 210 receives a first time series of data to describe the position of the one or more objects 112 on the touch surface 108. The application 210 determines the predicted position of the one of more objects 112 on the touch surface 108. The predicted position of the one or more objects 112 is based on the first time series of data. The application 210 outputs instructions or data for graphical representation of the predicted position in the form of the predicted touch trace 404.

In some embodiments the predicted touch trace 404 can be displayed differently from the determined touch trace 402. For example, the predicted touch trace 404 can be a different colour, or a softer, fuzzier, or more transparent representation than the determined touch trace 402. In some embodiments there can be a dynamic visual transition between the predicted touch trace 404 and the determined touch trace 402. For example, the predicted touch trace 404 can blend into the determined touch trace over a period of time. Alternatively, the predicted touch trace 404 and the determined touch trace can be visually identical.

The application 210 can create the visual effect of the predicted touch trace 404 to reduce the perceived total system latency. However, there can be discrepancies between the predicted touch trace 404 and the determined touch trace 402. This can happen if the input device 406 is moving rapidly and/or is changing direction and orientation unexpectedly. This can mean that the predicted touch trace 404 differs from the determined touch trace 402. For example, drawing errors such as overshoots can be experienced by the user. The visual effect of the discrepancy between the predicted touch trace 404 and the determined touch trace 402 can be jarring for the user and impair the user experience.

Figure 5:
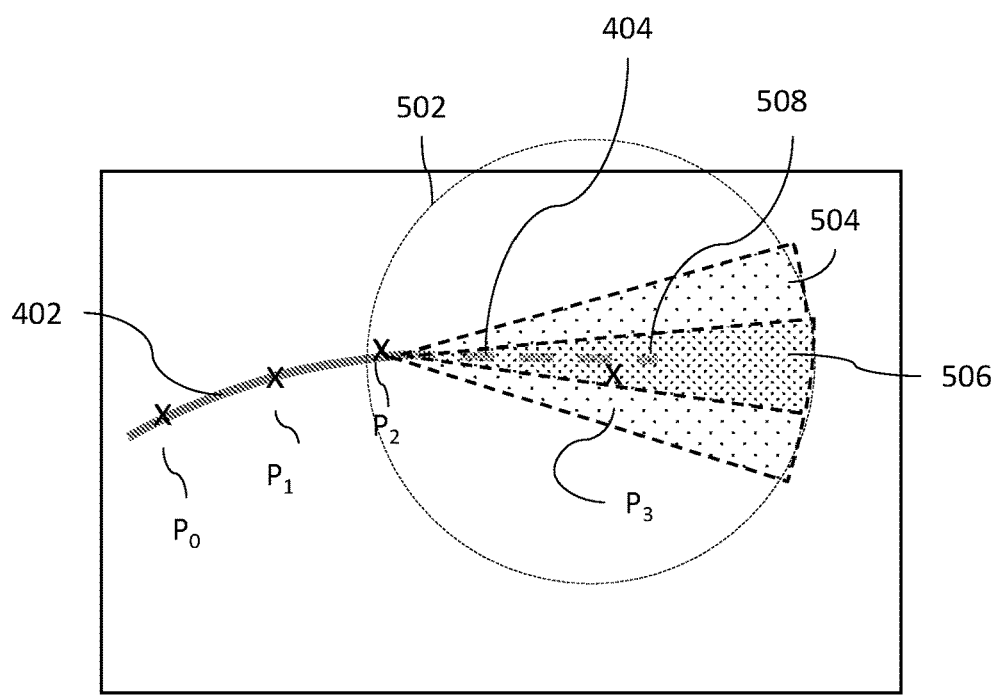
FIG. 5 shows a representation of an output of a touch system.

The predicted touch trace 404 will now be discussed in reference to FIG. 5 in greater detail. FIG. 5 shows a representation of an output of a touch system 200 on a display device 204 showing a close up of the determined touch trace 402 and the predicted touch trace 404. The determined touch trace 402 is formed from a first time series of location data received from the touch controller 118. The first time series of touch data is represented in FIG. 5 by a plurality of object position values or touch event coordinates; $P_0$ $P_1$, $P_2$. The process of determining the determined touch trace 402 is known and discussed in detail in the related patent documents previously mentioned and incorporated by reference. For the purposes of expediency, no further discussion of the determined touch trace 402 will be made.

As mentioned previously, the predicted touch trace 404 is based on the first time series of data describing the position of one or more objects on the touch surface 108. This can be seen from FIG. 5 by the plurality object position values $P_0$ $P_1$, $P_2$. The application 210 uses the first time series of data to draw the determined touch trace 402. The predicted touch trace 404 is a prediction of the future path of the determined touch trace 402 and is based on the same object position values of the first time series. The application 210 generates the predicted touch trace 404 using interpolation, extrapolation or any other suitable statistical method using the first time series of data based describing the position of one or more objects 112 on the touch surface 108.

In some embodiments the first time series of data $P_0$ $P_1$, $P_2$ describing the position of one or more objects 112 on the touch surface 108 comprises information (e.g. x, y coordinates) representing the location of a determined touch trace 402 at sequential points in time. Any suitable location information or coordinate format can be used for describing the location of the position data in the first time series. Coordinate data is represented for example, by Cartesian coordinates, Polar coordinates, or an index reference corresponding to a predetermined position on the touch surface 108 etc. The predicted touch trace 404 is an on-going updated signal, as long as the input device 406 is being detected by the touch-sensitive apparatus 100. This means that application 210 is continually updating the predicted touch trace 404 based on new updated object position values added to the first time series of data, e.g. $P_3$, $P_4$ and so on.

In some applications, it may be desirable to extend the length of the predicted touch trace 404. This can reduce the perceived total system latency by the user. FIG. 5 shows the predicted touch trace 404 as represented by a dotted line. The predicted location of the end 508 of the predicted touch trace 404 is determined by the application 210. The path of the predicted touch trace 404 varies in probability according to the distance and angle from the most recent object position value data in the first time series e.g. $P_2$. The likelihood of the path predicted touch trace 404 is represented by the probability circle 502. In this way, the predicted touch path 404 is a representation of the most likely position of the next object position value to be received in the first time series e.g. $P_3$.

For example, the next determined object position value $P_3$ is likely to be located anywhere in the probability circle 502. In some embodiments the chances of the next determined object position value $P_3$ falls outside the probability circle 502 may be non-zero because the speed and direction of the input device 406 can rapidly change. In this way, the probably circle 502 is merely representative of the varying probability of where the next determined object position value $P_3$ will be located.

The white area in the probability circle 502 represents a low probability of the location of next determined object position value $P_3$. This means that the predicted touch trace 404 is unlikely to be drawn in this area. However, if the input device 406 changes direction rapidly, it is possible that the predicted touch trace 404 does suddenly change direction once the next determined object position value $P_3$ is received.

The probability circle 502 also comprises a larger first segment 504 and a smaller second segment. The probability of the next determined object position value $P_3$ and hence the future path of the predicted touch trace 404 falling in the larger first segment 504 is greater than the white circle 502. Indeed, the probability is even higher in the smaller second segment 506.

As can be seen from FIG. 5, the newest determined object position value $P_3$ is located in the smaller second segment 506 which is expected based on the probability. However, the predicted touch trace 404 is only a predicted location. It can be seen from FIG. 5 that the newest determined object position value $P_3$ of the first time series is not located on the predicted touch trace 404.

Since the first time series has new location data, the application 210 can update the predicted touch trace 404. Accordingly, the predicted touch trace 404 is updated and the leading end 508 is redrawn. Furthermore, the trailing edge of the predicted touch trace 404 adjacent to the newest determined object position value of the first time series is also redrawn. The process for determining and drawing the predicted touch trace 404 in some embodiments is calculated from a p-spline regression. In other embodiments other statistical methods can be used for calculating the predicted touch trace 404, such as linear extrapolation, extrapolation using least square fitting of low order polynomial, etc.

The predicted touch trace 404 can be more accurate if location data is provided to the application 210 with a lower latency.

Figure 6:
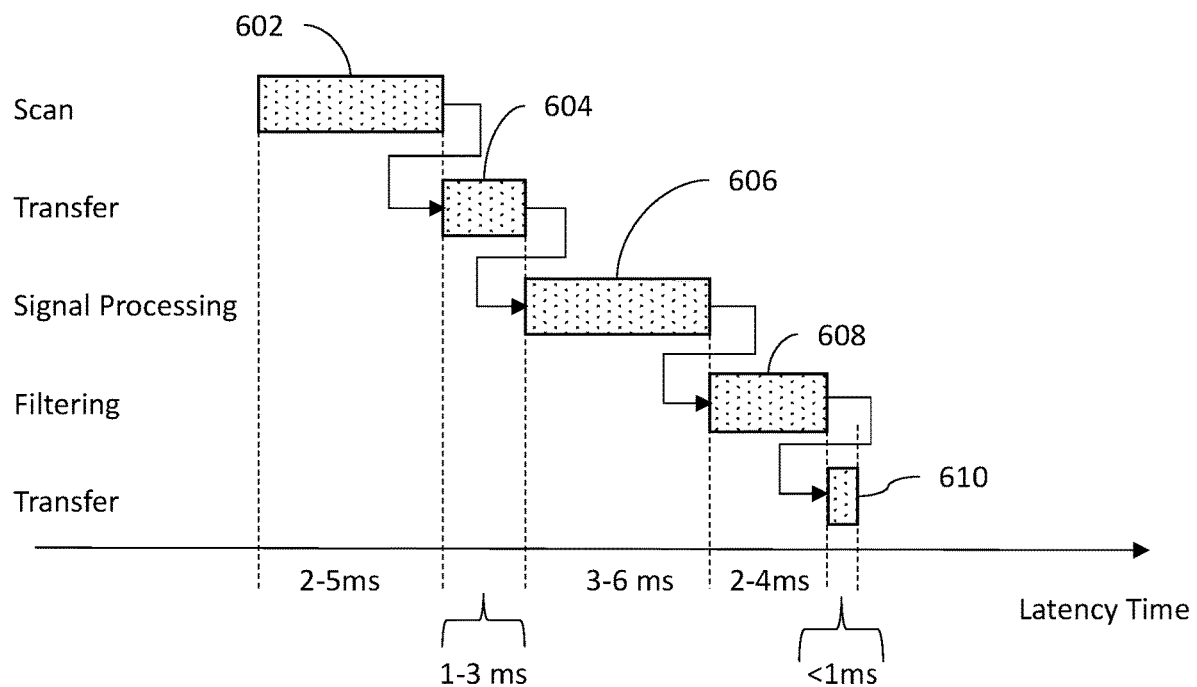
FIGS. 6 and 7 show a flow diagram and latency timing diagram of the method of determining a touch on a touch-sensitive apparatus.

The operation of the acquiring the first time series describing the position of the touch object for the predicted touch trace 404 will now be discussed in reference to FIG. 6. FIG. 6 shows a flow diagram of a series of steps carried out by the touch system 200 over time. The timing in FIG. 6 represents the latency time in the touch-sensitive apparatus 100. The order of the steps is indicated by the connecting arrows between the process blocks. The touch-sensitive apparatus 100 scans the touch surface 108 for any touch events as shown in step 602. One such scanning process has been previously discussed in reference to FIGS. 1 and 2. Of course different scanning techniques may be used depending on the type of touch-sensitive apparatus 100. In some embodiments the scanning step 602 can take approximately 2 ms to 5 ms. The scanning step can be varied by using interleaving or progressive scanning methods.

Once a touch event has been detected by the scanning step in 602, the touch signal or other touch information associated with the touch event is transferred to the touch controller 118 as shown in step 604. In some embodiments, the step of transferring the information associated with the touch signal can take up to 3 ms.

Once the touch controller 118 has received the touch signal associated with a detected touch event, the reconstruction module 218 of the touch controller 118 performs reconstruction signal processing as discussed above to determine the location of the touch event on the touch surface 108 as shown in step 606. The reconstruction signal processing can take approximately 3 ms to 6 ms. The filtering module 220 of the touch controller 118 then performs other signal processing such as filtering as shown in step 608. The filtering step 608 can take approximately 2 ms to 4 ms. After step 608, the touch controller 118 has generated the determined location data describing the location of one or more objects 112 on the touch surface 108. The touch controller 118 outputs the object position values as a first time series. The touch controller 118 is periodically updating object position values of the first time series. In this way FIG. 6 represents one cycle of the operation of the touch controller 118 and the cycle is repeated to determine new object position values of the first time series of the touch signal associated with the detected touch object 112.

The touch controller 118 transfers the object position value of the first time series to the host control device 202 as shown in step 610. The step of transferring the data to the host control device can take less than 1 ms. In some embodiments, the object position value of the first time series is transferred to the operating system 208 for processing, but in alternative embodiments object position value of the first time series is sent to the application 210 running on the host control device 202 for processing, via the operating system 208. As mentioned previously, the application 210 can generate the predicted touch trace 404 once the object position value of the first time series data describing the position of the one or more objects 112 on the touch surface 108 has been received. The touch system latency for transferring the object position value of the first time series can be between 11 ms to 21 ms for a progressive scanning pattern and between 14 ms to 24 ms for an interlaced scanning pattern.

Figure 7:
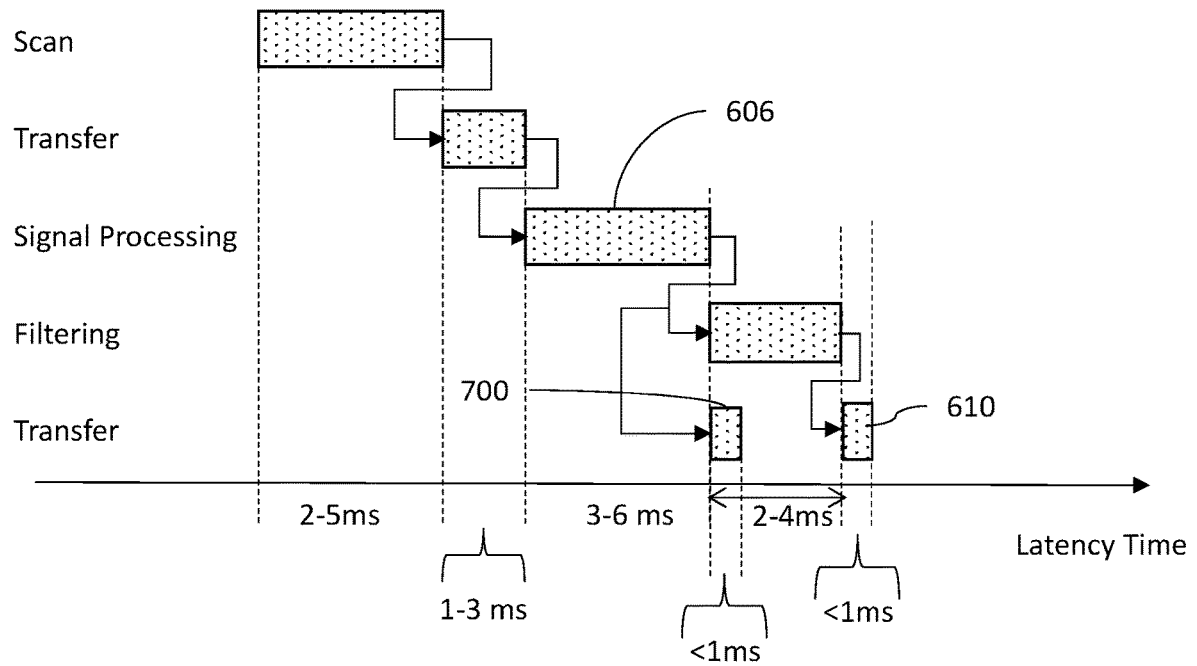

An embodiment will now be discussed with respect to FIG. 7. FIG. 7 shows a flow diagram of a series of steps carried out by the touch system 200 over time. FIG. 7 is the same as FIG. 6, except that a second time series of location data is outputted from the touch controller 118 as shown in step 700.

The second time series of location data describes the position of one or more objects on the touch surface 108. Similar to the first time series of location data, the second time series is a plurality of object position values or touch event coordinates. The touch controller 118 outputs the object position values as a second time series. The touch controller 118 is periodically updating object position values of the second time series. In this way, FIG. 7 represents one cycle of the operation of the touch controller 118 and the cycle is repeated to determine new object position values of the first and second time series of the location data.

The object position value of the second time series is outputted from the touch controller 118 before the touch controller 118 has performed all the signal processing in step 606. Accordingly, only partial signal processing is carried out to generate a rough estimate of the location of touch event. For example, some of the reconstruction techniques discussed above may be carried out to determine approximate location information of the touch event. As can be seen form FIG. 7, the touch surface pattern is determined from the reconstruction module 218 in step 606. However, other signal processing techniques such as filtering, smoothing may not be applied to the touch signal data associated with a touch event. This is in order to output an object position value of the second time series of location data associated with the touch event at an earlier time than the corresponding object position value of the first time series.

This means that a rough early object position value of the second time series can be used when the application 210 generates the predicted touch trace 404. However, the object position value of the second time series may not be as accurate as the later received object position value of the first time series because less or no signal processing, filtering and other noise reduction techniques are applied.

As shown in FIG. 7, the output of the object position value of the second time series of location data in a cycle of the touch controller 118 in step 700 is outputted from the touch controller before the object position value of the first time series. The touch system latency for transferring the object position value of the second time series from the touch controller 118 is between 5 ms to 8 ms. This means that the object position value of the second time series is received significantly earlier than the object position value of the first time series in each cycle of the touch controller 118.

Accordingly for the embodiment as shown in FIG. 7, the total latency of the second time series is 7 ms to 15 ms. In comparison the total latency of the first time series is 9 ms to 19 ms. The second time series can therefore have a lower latency of 2 ms to 4 ms.

The embodiments discussed in reference to FIG. 7 show that first time series and the second time series are processed sequentially. For example, turning to FIG. 7, the second time series is transferred in step 700 following the signal processing step 606. The same steps from FIG. 7 and FIG. 6 shown in FIG. 13 use the same reference numbers.

Figure 13:
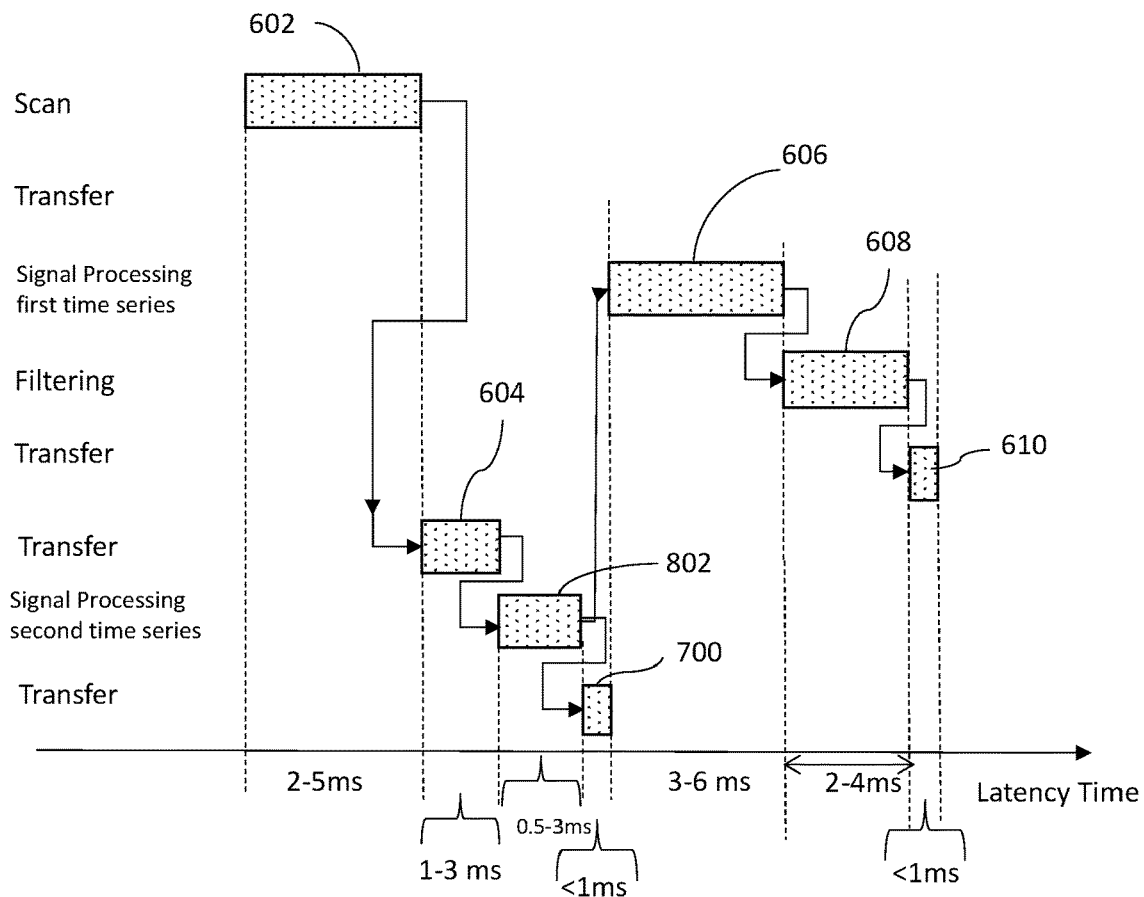
FIG. 13 shows an alternative flow diagram and timing diagram of the method of determining a touch on a touch-sensitive apparatus.

FIG. 13 shows an alternative flow diagram and timing diagram of the method of determining a touch on a touch-sensitive apparatus 100. FIG. 13 is the same as FIG. 7 except that the signal processing of the first time series and the second time series are carried out in separate steps. In this embodiment, the signal processing into two sequential phases. After the first phase (comprising e.g data unpacking, and detection line validation) is completed, the second time series can be transferred to the host operating system. After this transfer, the CPU continues to do signal processing (comprising e.g. transmission differentials, sinogram interpolation, reconstruction, post-processing, output coordinate smoothing, etc). When this second phase is completed, the first time series data is transferred to the host OS. In this way, the second time series has approximately 12 ms lower latency (for the interleaved embodiment described below). In this embodiment, the CPU cannot execute the second phase without first doing the first phase. If the processing is split on two CPUs, the CPU outputting the first time series will have to execute the first phase as well as the second.

Once a touch event has been detected by the scanning step in 602, the touch signal or other touch information associated with the touch event is transferred to the touch controller 118 as shown in step 604. In some embodiments, the step of transferring the information associated with the touch signal can take up to 3 ms.

Once the touch controller 118 has received the touch signal associated with a detected touch event, the reconstruction module 218 of the touch controller 118 performs reconstruction signal processing as discussed above to determine the location of the touch event on the touch surface 108 as shown in step 802. The reconstruction signal processing can take approximately 3 ms to 6 ms.

Similar to FIG. 7 and as shown in FIG. 13, the output of the object position value of the second time series of location data in a cycle of the touch controller 118 in step 700 is outputted from the touch controller before the object position value of the first time series. The sequential steps 604, 606, 608 and 610 are the same as previously discussed. Following step 610, the first time series of location data is transferred.

In some embodiments the signal processing step for the second time series in step 602 or 802 uses alternative touch processing techniques to the above mentioned touch tomographic reconstruction techniques. For example in some embodiments the touch processing techniques are low latency triangulation, partial reconstruction or push broom techniques as discussed in EP17172910.6 which is incorporated herein by reference.

In some embodiments the object position value of the second time series of location data comprises position values or touch coordinates. The object position values of the second time series can comprise the same format as the object position values of the first time series.

In some embodiments the second time series of location data can comprise additional information relating to one or more characteristics of the detected touch event. In some embodiments the additional information is metadata comprising one or more of the following characteristics: device lift up indication, pressure of device, orientation of device, angle of device, shape of device, speed of device, direction of device, type of device. In other embodiments the first time series of location data can alternatively or additionally comprise all the above metadata.

In one alternative embodiment the touch controller 118 outputs the object position value of the second time series and the most recently recorded confirmed object position value of the first time series at the same time. For example turning to FIG. 10, a new object position value of the second time series $T_5$ is received before the new object position value of the first time series $P_5$. However the object position value of the second time series $T_5$ is received after the previous object position value of the first time series $P_4$. In this embodiment the new object position value of the second time series $T_5$ is sent with the previous object position value of the first time series $P_4$. In other words, an object position value of the first time series of an earlier scan frame is outputted together with the object position value of the second time series of the current scan frame.

This introduces a slight extra latency for the object position value of the first time series $P_4$ because the touch controller 118 has to wait for the object position value of the second time series $T_5$ to be generated. However this improves compatibility with an operating system 208 that is not configured to process separate data channels 214, 212 concurrently.

If the metadata comprises information relating to device lift up indication, then the host control device 202 and the application 210 receive an early indication that the input device 406 is not currently engaged with the touch surface 108. This means that the application 210 will not continue to draw a predicted touch trace 404 on receipt of a device lift up indication.

In some embodiments the object position value of the second time series is outputted from the touch controller 118 directly to the application 210 as shown by arrow 214 in FIG. 3. The object position value of the second time series can be sent by a different connection path between the touch controller 118 and the host control device 202. In some embodiments the connection paths between the touch controller 118 and the host control device 202 are over USB channels. The connection path may be a different channel from the channel on which the object position value of the first time series of location data is outputted. In other words, the object position value of the first time series is sent via a different connection path to the object position value of the second time series of location data. In some embodiments the object position value of the second time series is sent over a USB side channel 214. USB transfer may be expected to take less than 1 ms. The connection path 214 can be a logical or physical connection.

This means that by assigning different channels for the first and second time series of location data, this may improve compatibility with an operating system.

However, in other embodiments, both the object position values of the first and second time series of location data can be multiplexed over the same channel. In this case, the object position values of the first and second time series must be packaged with a data type indicator so that the host control device 202 can distinguish between the different types (e.g. first time series or second time series) time series data.

As mentioned, in some embodiments the object position value of the second time series is sent to the application 210 for processing. By sending the object position value of the second time series to the application 210 for processing, the operating system 208 is less likely to apply buffering, filtering and/or resampling and add further latency to the total system latency. In other embodiments the touch controller 118 can alternatively output the object position value of the second time series to the operating system 208 rather than the application 210 via connection 216.

A further embodiment will now be discussed in reference to FIGS. 8 to 12. FIGS. 8 to 12 show sequential representations of an output of the touch system 200.

Figure 8:
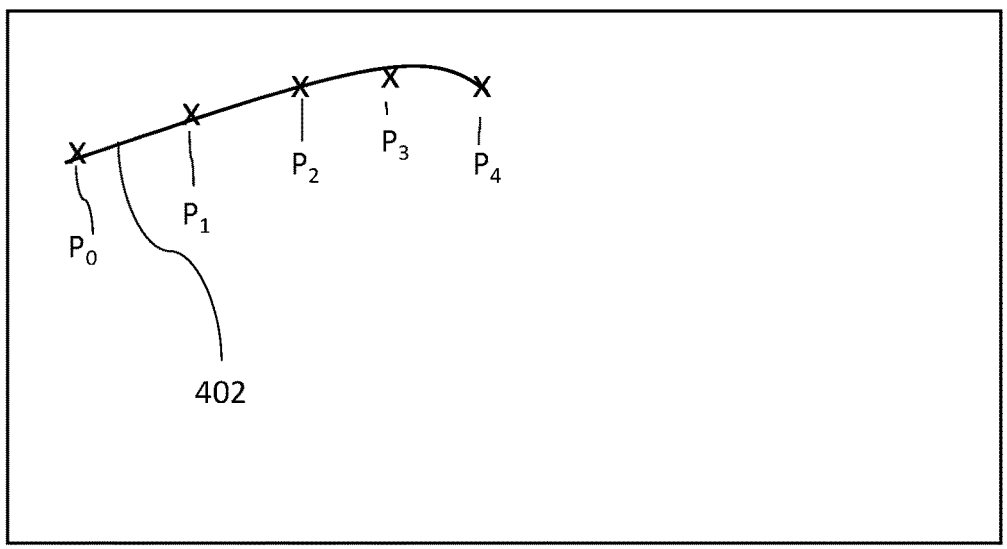
FIGS. 8 to 12 show sequential representations of an output of a touch system.

In FIG. 8 there is shown a graphical representation of a first time series of location data having plurality of object position values, $P_0, P_1, P_2, P_3, P_4$. The object position values of the first time series are used to generate the determined touch trace 402 and by the application to generate the predicted touch trace 404.

The subscript of the coordinates indicates the time sequence or scan frame in which the object position values were received at the host control device 202 and application 210. In FIG. 8, the object position value of the second time series has not yet been outputted from the touch controller 118. In this way step 700 has not been carried out yet. For the purposes of clarity, the predicted touch trace 404 is not shown in FIG. 8.

In one embodiment, a scan frame is a complete cycle of each emitter 104 being activated. In other embodiments, for example in embodiments implementing an interleaved scanning mode, a scan frame is a complete cycle of a subset of emitters 104. FIGS. 8 to 12 indicate object position values from different scan frames. However, object position values of the first time series have been smoothed with time average algorithms. In this way an object position value of the first time series is dependent on at least some data from preceding scan frames. Corresponding object position values from the first and the second time series are based on at least some data from the same scan frame.

Figure 9:
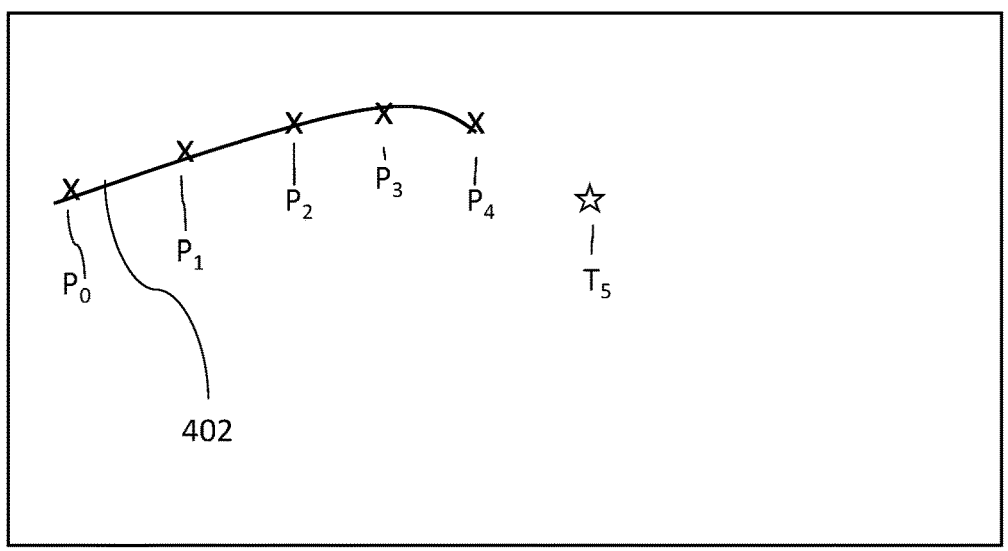

In contrast FIG. 9 shows a new object position value of the second time series $T_5$ has been received from the touch controller 118 having completed step 700. For the purposes of clarity FIGS. 8 to 12 only show object position values from the second time series being received after the object position value $P_4$ of the first time series has been received. The transmission of the object position value $T_5$ of the second time series means that the predicted touch trace 404 can be updated more quickly. Additionally, or alternatively the length of the predicted touch trace 404 can be extended.

Figure 10:
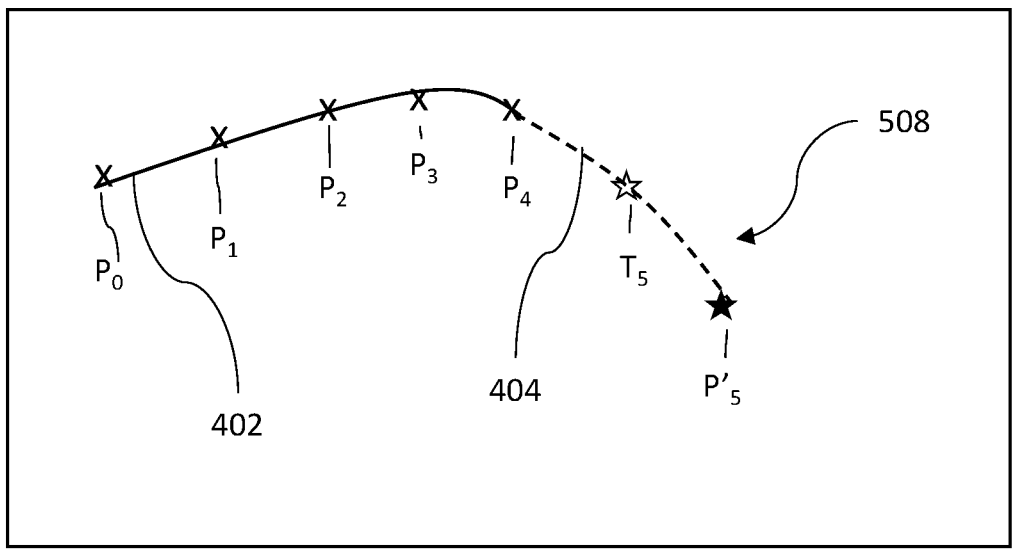

Turning to FIG. 10 the leading end 508 predicted touch trace 404 can be seen as the solid star icon $P'_5$. The predicted touch trace 404 can be extended as far as $P'_5$ because the object position value $T_5$ of the second time series is received earlier than corresponding object position values of the first time series, for example within 1 ms-6 ms. A corresponding object position value for the first and second time series are object position values which are based on the same touch signal. In other words, corresponding object position values in the first and second time series are generated in the same cycle of the touch controller for the same detected touch event.

Figure 11:
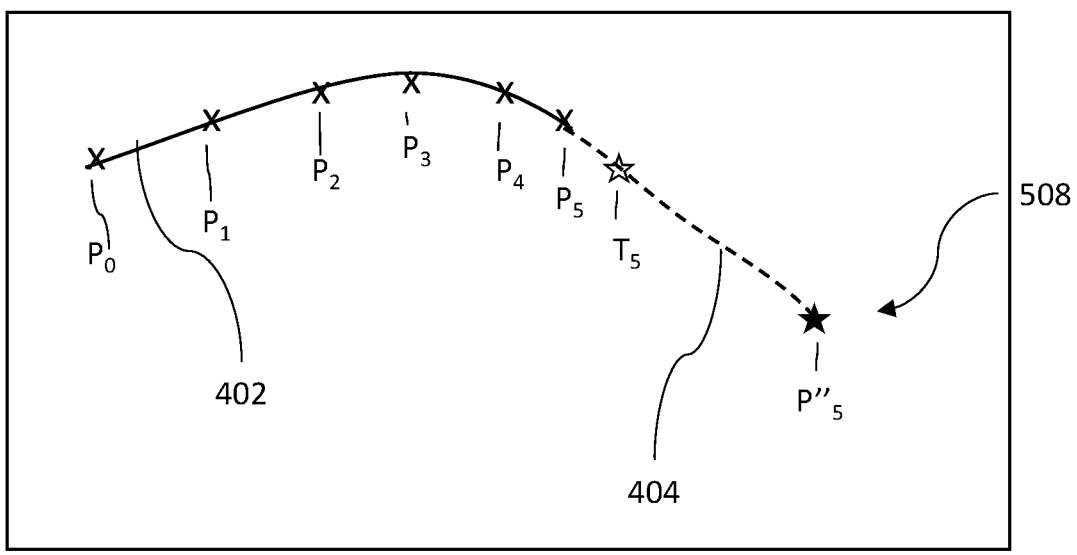

FIG. 11 shows that step 610 has been carried out and the next object position value $P_5$ of the first time series has been received from the touch controller 118. $P_5$ is located closer to the object position value $T_5$ of the second time series. Since $P_5$ is newer and more accurate having undergone additional signal processing, the weighting of $P_5$ when compared to $T_5$ can be greater. Nevertheless, the additional object position value of the first time series $P_5$ means that the predicted touch trace 404 can be extended again as far as $P''_5$.

Figure 12:
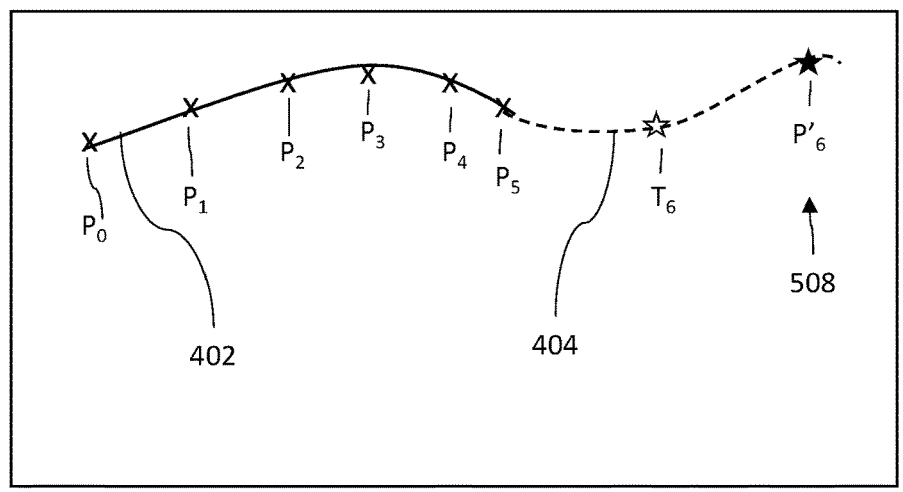

After another 1 ms to 6 ms another new object position value $T_6$ of the second time series is received from the touch controller 118 as shown in FIG. 12. Again, the predicted touch trace 404 can be updated accordingly. Since the object position value $T_6$ is recent, it can be given a higher weighting when calculating the predicted touch trace 404. The predicted touch trace 404 is extended to coordinate $P'_6$.

In this way, the perceived latency of drawing the predicted touch trace 404 can be reduced by providing rough coordinates quickly from the touch controller 118.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

The invention claimed is:

1. A method of predicting the behaviour of one or more objects on a touch surface of a touch-sensitive apparatus, the method comprising:
   outputting an object position value of a first time series describing a position of the one or more objects on the touch surface;
   outputting an object position value of a second time series describing a position of the one or more objects on the touch surface; wherein the object position value of the second time series is outputted before the corresponding object position value of the first time series; and
   predicting the behaviour of the one or more objects based at least on the object position values of the second time series.

2. A method according to claim 1 wherein the predicted behaviour is a predicted position of the one or more objects, a predicted removal of the one or more objects from the touch surface, a predicted orientation of the one or more objects and/or a predicted movement of the one or more objects.

3. A method according to claim 1 wherein the object position value of the first time series is more accurate than the object position value of the second time series.

4. A method according to claim 1 wherein the step of outputting the object position value of the first time series is via a first connection path and the step of outputting the object position value of the second time series is via a second connection path.

5. A method according to claim 4 wherein the first and/or the second connection paths are logical or physical data connections.

6. A method according to claim 4 wherein the outputting of the object positions value of the second time series comprises outputting over second channel different from the first channel.

7. A method according to claim 1 wherein the step of outputting the object position value of the first time series comprises outputting over a human interface device channel.

8. A method according to claim 1 wherein the first time series comprises coordinates according to a native standard of an operating system.

9. A method according to claim 1 wherein the second time series and/or the first time series comprises one or more metadata respectively associated with the object position value of the second time series and/or the first time series.

10. A method according to claim 9 wherein the metadata in the first time series and/or the second time series is one or more of the following device lift up indication, pressure of device, orientation of device, angle of device, shape of device, speed of device, direction of device, type of device.

11. A method according to claim 1 wherein the object position value of the second time series are outputted from a touch controller of the touch-sensitive apparatus to an application of a host device.

12. A method according to claim 1 wherein the object position value of the first time series are outputted from a touch controller of the touch-sensitive apparatus to an operating system of a host device.

13. A method according to claim 1 wherein the outputting of the object position value of the second time series is carried out before signal processing is completed on the corresponding object position value of the first time series.

14. A method according to claim 13 wherein the signal processing of the object value of the first time series comprises one or more of smoothing, filtering and/or reconstruction.

15. A method according to claim 1 wherein the predicting the position comprises processing a plurality of object position values of the first and second time series from a plurality of different times to generate a predicted touch trace.

16. A method according to claim 1 wherein the step of predicting comprises reducing the weighting of the object position value of the second time series on receipt of an updated object position value of the first time series and/or an updated object position value of the second time series.

17. A method according to claim 1 wherein both the first time series and the second time series use at least some data from the same scan frame.

18. A non-transitory, tangible computer readable storage medium comprising computer instructions which, when executed by a data-processing system, are configured to carry out the method of 1.

19. A system for determining touch of one or more objects, the system comprising:
    a touch-sensitive apparatus comprising a touch surface and a processing unit for processing an output signal of the touch-sensitive apparatus at a particular time;
    wherein the touch-sensitive apparatus is configured to output an object position value of a first time series describing the position of the one or more objects on the touch surface; and
    to output an object position value of a second time series describing the position of the one or more objects on the touch surface; wherein the object position value of the second time series is outputted before the corresponding object position value of the first time series.

20. A system for determining touch of one or more objects, the system comprising:
    a touch-sensitive apparatus comprising a touch surface and a processing unit for processing an output signal of the touch-sensitive apparatus at a particular time;
    wherein the touch-sensitive apparatus is configured to output an object position value of a first time series describing the position of the one or more objects on the touch surface over a first connection path; and
    the touch-sensitive apparatus is configured to output an object position value of a second time series describing the position of the one or more objects on the touch surface over a second connection path.

* * * * *